United States Patent [19]
Gandon et al.

[11] 3,821,354
[45] June 28, 1974

[54] METHOD FOR SELECTIVELY ABSTRACTING NICKEL FROM AN AQUEOUS AMMONIACAL SOLUTION

[75] Inventors: Louis Gandon; Marie Goulaouic, both of Le Havre, France

[73] Assignee: Le Nickel, Paris, France

[22] Filed: Mar. 28, 1972

[21] Appl. No.: 238,775

[30] Foreign Application Priority Data
Mar. 29, 1971 France .................. 71.10922

[52] U.S. Cl. ............ 423/139, 75/103, 75/108, 75/119
[51] Int. Cl. .. C01g 53/00, C22b 23/04, C01g 53/12
[58] Field of Search ...... 75/103, 108, 119; 423/139, 423/140

[56] References Cited
UNITED STATES PATENTS
| | | | |
|---|---|---|---|
| 2,993,782 | 7/1961 | Hampton et al. | 75/108 |
| 3,007,793 | 11/1961 | Grimes | 75/108 |

OTHER PUBLICATIONS
Jones, M. M., A New Method of Preparing Some Acetylacetonate Complexes in J. Am. Chem. Soc. 81 pp. 3188–3189 (1959)

Lamprey, Properties and Applications of Metal Acetylacetonates in Ann. N. Y. Acad. Sci. 88, 519–525 (1960). Reported in Chem. Abs. Vol. 55, 14152f Primary Examiner—Oscar R. Vertiz
Assistant Examiner—Brian E. Hearn
Attorney, Agent, or Firm—Fleit, Gipple & Jacobson

[57] ABSTRACT

Nickel is recovered from an aqueous solution containing salts of nickel, cobalt, and various other metals by a process comprising adjusting the amount of ammonium ions in the solution so that all of the nickel present in the solution is in the form of its hexamine complex and all the cobalt present is in the form of its pentamine complex; contacting the solution with acetyl acetone until a nickel precipitate is formed; and thereafter recovering the nickel values from the precipitate.

6 Claims, 1 Drawing Figure

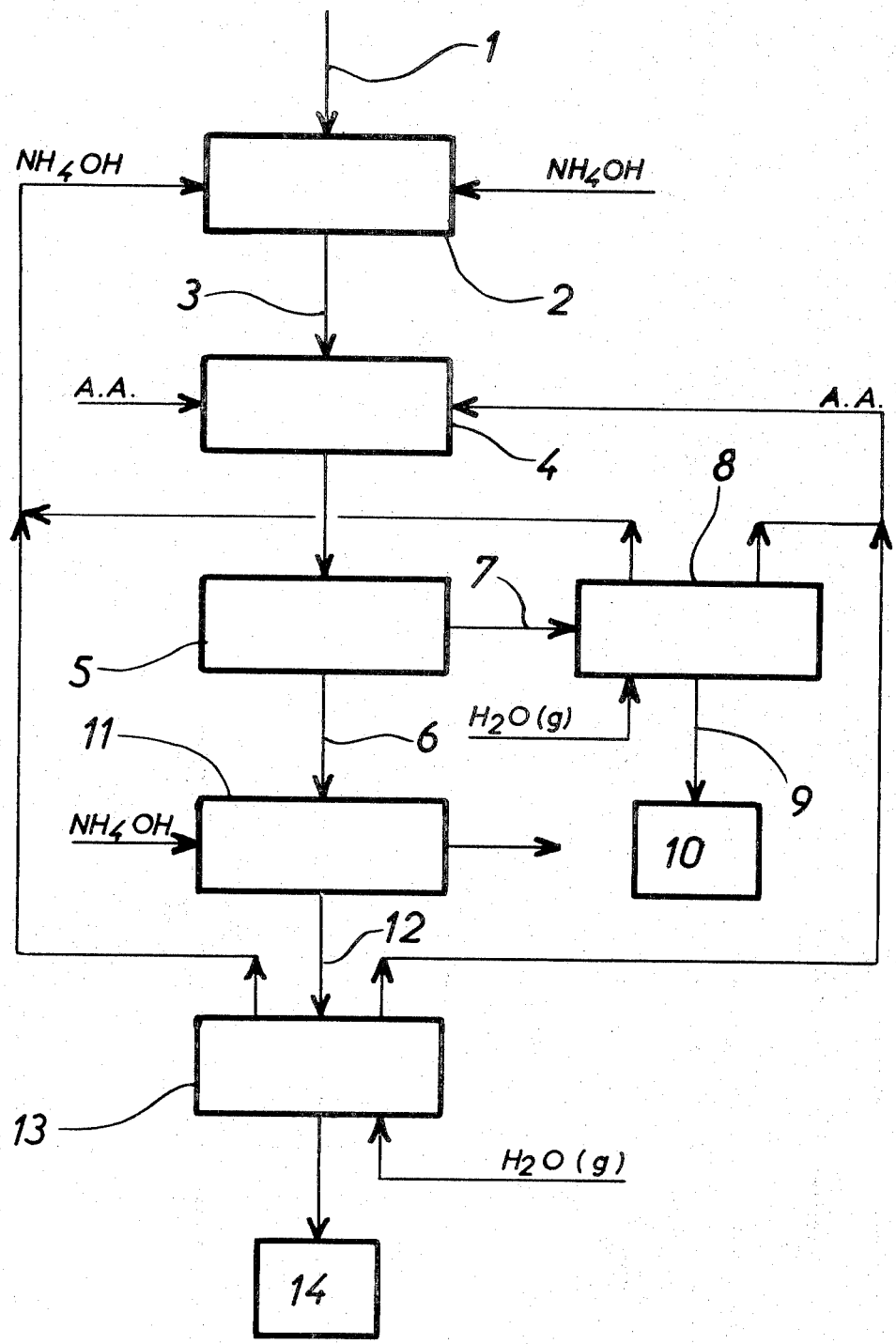

METHOD FOR SELECTIVELY ABSTRACTING NICKEL FROM AN AQUEOUS AMMONIACAL SOLUTION

The present invention relates to a method for selectively extracting nickel from an aqueous ammoniacal solution.

It is well-known that the leaching of nickel ores or nickel concentrates leads to aqueous solutions of nickel salts containing also cobalt salts and minor amounts of salts of various other metals such as zinc, copper, manganese, and magnesium.

It is a general object of the present invention to recover nickel and other valuable metals, such as cobalt, contained in such solutions.

Various methods of recovery have already been proposed but they are generally based on the chemical elimination of all metals other than nickel which is then recovered, for example by electrolysis, from the purified solution. However, the elimination of the impurities involves quite a number of filtration steps, which renders the industrial application of such methods costly. Another method consists in using the liquid-liquid extraction technique for removing the impurities, but this involves intricate technology and the process is difficult to operate.

One object of the present invention is to provide a method which allows the separation, in a very small number of steps, of virtually all the nickel contained in an ammoniacal solution, one single filtration recovering quantitatively and selectively all this metal and separating it from the other metallic values which are present in the solution.

A further object of the invention is to provide a method of this type which can be carried out with any kind of lixiviation solution in which the cobalt is in the form of trivalent cations, independently of the form of the anions which can be, for instance, carbonates, chlorides, or sulphates.

According to the present invention there is provided a method for selectively extracting nickel from an aqueous ammoniacal solution containing cobalt (III) and other metallic values, comprising the steps of adjusting, if necessary, the amount of ammonium ions in the solution so that all the nickel present is in the form of its hexamine complex, and all the cobalt present is in the form of its pentamine complex, the zinc and the copper present in the solution being in the form of soluble complexes, contacting the solution with acetylacetone until a precipitate is formed, and recovering nickel values contained in this precipitate.

The expression "nickel values" means, as well as nickel in the form of metal, also nickel compounds which may be for example, salts, oxides, hydroxides and others.

It is to be noted that the production of nickel acetylacetonate has already been proposed, for instance by Mark M. JONES in "Journal of American Chemical Society" 81 (1959), p. 3,188–3,189, but this does not relate to the use of acetylacetone for the separation of nickel from other metals.

The aqueous initial solution can be, for example, a solution resulting from the ammoniacal leaching of nickel oxide ores such as laterite and, in this case, the solution generally contains sufficient ammonium ions to render unnecessary the adjustment of the amount of ammonium ions in the solution. In other cases, it may be necessary to add ammonium ions in an amount as indicated above, and those skilled in the art can readily determine, for instance by means of chemical analysis, if it is necessary or not to add ammonium ions to the solution to be treated and, if so, the amount of such ions which must be added.

If the initial solution contains metals other than nickel and cobalt, especially zinc and copper, said nickel precipitate is preferably washed by means of concentrated ammonia.

Generally, the zinc and copper amounts are low when compared with the amount of nickel, and the amine complexes of both these metals do not react with acetylacetone, because the affinity of the latter for nickel amine complexes is higher. The small amounts of magnesium and calcium which can be present in the solution are recovered in the filtrate and do not effectively impair the purity of the nickel. On the other hand, even small amounts of manganese in an ammoniacal solution lead to the formation of a solid yellow complex which remains with the blue nickel complex, and this complexing of manganese takes place to the detriment of the cobalt complex. Thus, if it is impossible to avoid the presence of manganese in the initial solution, it is necessary to dissolve again the nickel precipitate in a convenient solvent before the ammoniacal washing which may give rise to a slight precipitation of manganese hydroxide $Mn(OH)_3$. The solvent may be acetone which does not dissolve the nickel complex.

Advantageously, the amount of acetylacetone which is used is at least near the stoichiometric amount, i.e., 2 moles for one gramme-atom of nickel and 3 moles for one gramme-atom of trivalent cobalt. If technical acetylacetone is used, it can be first washed with a weak ammoniacal solution in order to remove from it the small amounts of acetic acid it contains, and then distilled after washing with water.

The aforementioned precipitate is preferably heated at about 120°C in the presence of steam, which liberates ammonia and acetylacetone. It is obviously possible to recycle these products for obtaining fresh amounts of the precipitate.

In the same manner, it is convenient to treat the initial aqueous solution with steam after the formation of said precipitate; ammonia and acetylacetone are thus recovered and recycled in the same way.

An embodiment of the present invention will now be described, by way of example, with reference to the accompanying drawing which is a diagrammatic flowsheet showing the various steps of an extraction method according to the invention.

The initial product in this example is a laterite 1 which is subjected at 2 to the well-known treatment of selective prereduction and ammoniacal leaching. An initial aqueous solution 3 is thus obtained with a pH near 10, and a composition approximately as follows:

|       | g/l   |
|-------|-------|
| -$NH_3$ | 58    |
| -$CO_2$ | 45    |
| -Ni   | 8.3   |
| -Co   | 0.74  |
| -Zn   | 0.1   |
| -Cu   | 0.1   |

This solution is then introduced into a contacting device 4, together with acetylacetone, in such an amount that there are 2 moles of the acetylacetone for one gramme-atom of nickel and 3 moles of the acetylacetone for one gramme-atom of cobalt.

In the case of the present example, a litre of solution contains $8.30/58.7 = 0.1414$ gramme-atom of nickel, and $0.74/58.9 = 0.0125$ gramme-atom of cobalt; it is necessary to use $2 \times 0.1414 + 3 \times 0.0125 = 0.32$ mole acetylacetone for one litre of solution.

The contacting operation is carried out at a temperature lower than 50°C in order to limit the losses by evaporation, and preferably at room temperature; the duration of this operation depends of course on the quantities to be treated, and is about 10 minutes in the present case.

The nickel precipitate formed in the contacting device 4 is filtered at 5, and this filtration is remarkably simple as the filters should never clog. In this manner, a precipitate 6 is separated from filtrate 7, the filtrate being freed of ammonia and acetylacetone at 8 by means of superheated steam. The recovered products are respectively recycled to the ammoniacal leaching step 2 and to the contacting step 4. The aqueous solution 9 thus obtained contains essentially cobalt, and is passed to an installation 10 where the cobalt values are extracted by known means the details of which are not relevant to the present invention and will not be described. It is important to note that the filtrate 7 corresponds a cobalt/nickel ratio near 200, which demonstrates the selectivity of the extraction.

The nickel precipitate 6 is subjected to a washing step 11 by means of technical ammonia ten times molar. This step frees the precipitate of the impregnating cobalt solution and, if any, of the small amounts of zinc and copper which may be present.

In this washed precipitate, the nickel/cobalt ratio is near 5,000 and this demonstrates that it is possible, as a result of the invention, to carry out an extraction which is extremely selective with regard to cobalt.

Lastly, the washed precipitate 12 is heated at 13 by means of superheated steam, which leads to a release of ammonia, on the one hand, and of acetylacetone, on the other hand. These products, like those which come from step 8, are respectively recycled for leaching fresh amounts of ore at 1 and to the contacting device 4.

The residue of step 13 comprises nickel oxide more or less hydrated, wherefrom nickel or a commercially useful nickel compound can be extracted by suitable known means.

Other tests have shown that the nickel extraction can also be carried out by means of the method according to the invention, when using an initial solution wherein the anions are essentially sulphate or chloride ions. However, in such a case, it is recommended to add ammonium ions to this initial solution in an amount which is at least the amount necessary for the complete complexation of the Ni, $Co^{+++}$, Cu and Zn ions. On the other hand, the amount of $NH_3$ and $CO_2$ in the initial solution need not necessarily to be as high as in the foregoing example.

It is obvious that the precipitate 14 which consists substantially of nickel hydroxide $Ni(OH)_2$, can subsequently be readily transformed to pure nickel or to a commercially valuable nickel salt. Such a transformation, which does not enter the scope of the present invention, is well-known by those skilled in the art and described in technical literature, so that it is unnecessary now to give a detailed description.

What we claim is:

1. A method for selectively extracting nickel from an aqueous ammoniacal solution containing cobalt (III) and other metallic values, comprising the steps of adjusting, if necessary, the amount of ammonium ions in the solution so that all the nickel present is in the form of hexamine complex and all the cobalt present is in the form of its pentamine complex, contacting the solution with acetylacetone until a precipitate is formed, and recovering nickel values contained in said precipitate.

2. A method as claimed in claim 1, wherein the amount of acetylacetone which is used at least the stoichiometric amount, i.e., 2 moles for one gramme-atom of nickel and 3 moles for one gramme-atom of trivalent cobalt.

3. A method as claimed in claim 1, wherein said precipitate is recovered by filtration.

4. A method as claimed in claim 1, wherein said precipitate is washed with concentrated ammonia.

5. A method as claimed in claim 1, wherein said aqueous solution is treated with steam after the extraction of said precipitate, the ammonia and acetylacetone produced thereby being used for the production of further quantities of the precipitate.

6. A method as claimed in claim 5, wherein said precipitate is heated at about 120°C in the presence of steam.

* * * * *